(12) United States Patent
Mikolajczak (10) Patent No.: US 9,172,239 B2
(45) Date of Patent: Oct. 27, 2015

(54) METHODS AND APPARATUS RELATED TO A PRECISION INPUT POWER PROTECTION DEVICE

(71) Applicant: Fairchild Semiconductor Corporation, San Jose, CA (US)

(72) Inventor: Adrian Mikolajczak, Los Altos, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 307 days.

(21) Appl. No.: 13/833,756

(22) Filed: Mar. 15, 2013

(65) Prior Publication Data

US 2014/0268462 A1 Sep. 18, 2014

(51) Int. Cl.
*H02H 9/00* (2006.01)
*H02H 9/04* (2006.01)

(52) U.S. Cl.
CPC . *H02H 9/04* (2013.01); *H02H 9/005* (2013.01)

(58) Field of Classification Search
CPC .......................................................... H01T 1/14
USPC ........................................................ 361/124
See application file for complete search history.

(56) References Cited

U.S. PATENT DOCUMENTS

| | | |
|---|---|---|
| 3,370,219 A | 2/1968 | Hupp |
| 3,702,418 A | 11/1972 | Obenhaus |
| 4,061,962 A | 12/1977 | Stewart |
| 4,163,186 A | 7/1979 | Haley |
| 4,533,970 A | 8/1985 | Brown |
| 4,652,964 A | 3/1987 | Ziegenbein |
| 4,975,798 A | 12/1990 | Edwards et al. |
| 5,164,874 A | 11/1992 | Okano et al. |
| 5,274,253 A | 12/1993 | Ogawa |
| 5,539,299 A | 7/1996 | Fernandez et al. |
| 5,748,422 A | 5/1998 | Heaston et al. |
| 5,763,929 A | 6/1998 | Iwata |
| 5,973,977 A | 10/1999 | Boyd et al. |
| 6,002,144 A | 12/1999 | Oishi |
| 6,015,992 A | 1/2000 | Chatterjee et al. |
| 6,114,672 A | 9/2000 | Iwasaki et al. |
| 6,137,338 A | 10/2000 | Marum et al. |
| 6,331,763 B1 | 12/2001 | Thomas et al. |
| 6,489,879 B1 | 12/2002 | Singh et al. |
| 6,521,483 B1 | 2/2003 | Hashimoto |
| 6,700,766 B2 | 3/2004 | Sato |
| 6,937,454 B2 | 8/2005 | Mikolajczak et al. |
| 7,031,130 B2 | 4/2006 | Simonelli et al. |
| 7,106,572 B1 | 9/2006 | Girard |

(Continued)

OTHER PUBLICATIONS

"An Investigation into the Physics of Blowing Polysilicon Fuses", Report for 62nd European Study Group with Industry, Limerick, 2008, pp. 1-13.

(Continued)

*Primary Examiner* — Stephen W Jackson
(74) *Attorney, Agent, or Firm* — Brake Hughes Bellermann LLP (57) ABSTRACT

In one general aspect, an apparatus can include an input terminal and an overvoltage protection device coupled to the input terminal and configured to receive energy via the input terminal. The overvoltage protection device can have a breakdown voltage at an ambient temperature less than a target maximum operating voltage of a source configured to be received at the input terminal. The apparatus can also include an output terminal coupled to the overvoltage protection device and a load.

20 Claims, 9 Drawing Sheets

(56) References Cited

U.S. PATENT DOCUMENTS

| | | |
|---|---|---|
| 7,164,185 B1 | 1/2007 | Salman et al. |
| 7,660,096 B2 | 2/2010 | Golubovic et al. |
| 8,031,449 B2 | 10/2011 | Burns et al. |
| 8,125,190 B2 * | 2/2012 | Odaohhara .................. 320/134 |
| 2002/0071233 A1 | 6/2002 | Bock et al. |
| 2002/0125931 A1 | 9/2002 | Yue et al. |
| 2003/0020133 A1 | 1/2003 | Dahlqvist et al. |
| 2004/0164355 A1 | 8/2004 | Litwin et al. |
| 2005/0057867 A1 | 3/2005 | Harris et al. |
| 2005/0225421 A1 | 10/2005 | Furuta et al. |
| 2005/0258805 A1 | 11/2005 | Thomas et al. |
| 2005/0275065 A1 | 12/2005 | Cogan et al. |
| 2006/0065891 A1 | 3/2006 | McCormack et al. |
| 2006/0215342 A1 | 9/2006 | Montoya et al. |
| 2007/0166942 A1 | 7/2007 | Cogan et al. |
| 2008/0130180 A1 | 6/2008 | De Palma et al. |
| 2008/0180871 A1 | 7/2008 | Hebert et al. |
| 2008/0203517 A1 | 8/2008 | Rueb et al. |
| 2008/0237608 A1 | 10/2008 | Richieri |
| 2009/0212937 A1 | 8/2009 | Stamer et al. |
| 2012/0127619 A1 | 5/2012 | Mikolajczak |
| 2012/0170163 A1 | 7/2012 | Mikolajczak |
| 2012/0194953 A1 | 8/2012 | Mikolajczak |
| 2012/0200967 A1 | 8/2012 | Mikolajczak |

OTHER PUBLICATIONS

AN10910, "Protecting charger interfaces and typical battery charging topologies with external bypass transistors," Application note, Rev. 01, Apr. 28, 2010, pp. 1-17.

"Failure Modes of Electronics", From Wikipedia, the free encyclopedia, Retrieved on Dec. 20, 2010, Document Available at: <http://en.wikipedia.org/wiki/Failure_modes_of_electronics> pp. 1-20.

"Thyristor", From Wikipedia, the free encyclopedia, Retrieved on Dec. 20, 2010, Document Available at: <http://en.wikipedia.org/wiki/Thyristor>, pp. 1-8.

Marak, Chad et al., "Application Note: Tips for Enhancing ESD Protection", Littelfuse, Inc., 2009, 4 pages.

* cited by examiner

METHODS AND APPARATUS RELATED TO A PRECISION INPUT POWER PROTECTION DEVICE

TECHNICAL FIELD

This description relates to an input power port protection component.

BACKGROUND

An integrated circuit (e.g., a downstream integrated circuit) can be protected from undesirable power conditions (e.g., overvoltage conditions) using an overvoltage protection device such as a transient voltage suppression (TVS) device. The overvoltage protection device may not be properly tuned to the integrated circuit for which the overvoltage protection device is targeted to protect. Accordingly, the overvoltage protection device selected for overvoltage protection may not provide overvoltage protection of the integrated circuit in a desirable fashion. For example, tolerance induced dead spots of an overvoltage protection device that is not properly matched to an integrated circuit targeted for protection may result in undesirable overvoltage protection. Various irregular failure modes and/or damage to integrated circuit intended for protection at the input power port may occur. Thus, a need exists for systems, methods, and apparatus to address the shortfalls of present technology and to provide other new and innovative features.

SUMMARY

In one general aspect, an apparatus can include an input terminal and an overvoltage protection device coupled to the input terminal and configured to receive energy via the input terminal. The overvoltage protection device can have a breakdown voltage at an ambient temperature less than a target maximum operating voltage of a source configured to be received at the input terminal. The apparatus can also include an output terminal coupled to the overvoltage protection device and a load.

The details of one or more implementations are set forth in the accompanying drawings and the description below. Other features will be apparent from the description and drawings, and from the claims.

DETAILED DESCRIPTION

Figure 1:
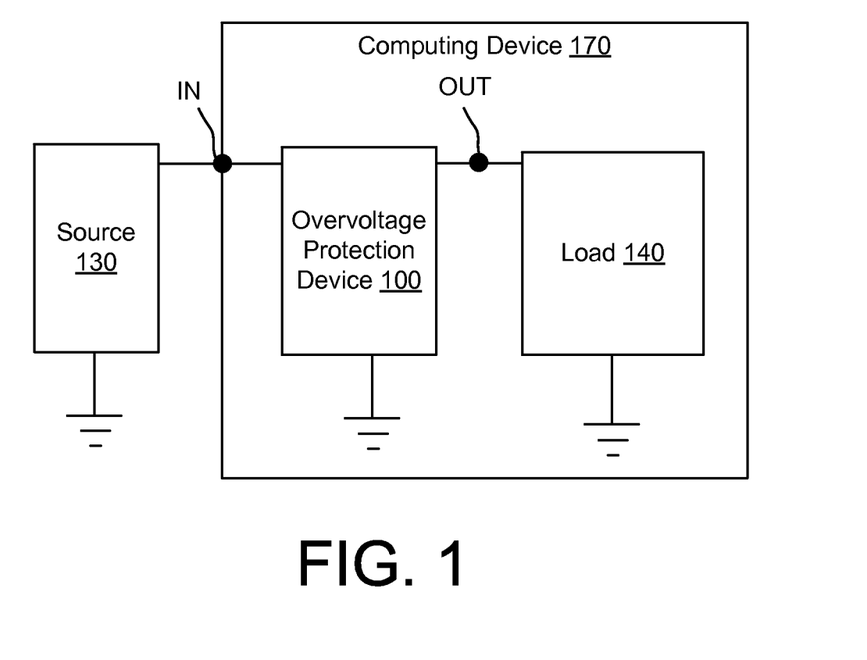
FIG. 1 is a diagram that illustrates an overvoltage protection device targeted to protect a load from an overvoltage condition.

FIG. 1 is a diagram that illustrates an overvoltage protection device 100 targeted to protect a load 140 (e.g., a downstream integrated circuit) from an overvoltage condition (also can be referred to as an overvoltage event). The overvoltage protection device 100 can be part of an input power protection component (not shown) coupled to the load 100. As shown in FIG. 1, the overvoltage protection device 100 and the load 140 are included in a computing device 170. The computing device 170 can be configured to be coupled to a source 130 (also can be referred to as a power source) configured to supply power to the computing device 170. In some embodiments, the overvoltage protection device 100 can be configured to provide protection to the load 140 that must be implemented considering an operating point (e.g., an expected operating point) of the source 130.

As shown in FIG. 1, the overvoltage protection device 100 is coupled to an input terminal (e.g., port) IN and an output terminal (e.g., port) OUT. The load 140 is coupled to the overvoltage protection device 100 via the output terminal OUT. In some embodiments, the input terminal IN can be an input terminal for the computing device 170. Power to the load 140 can be received via the input terminal IN, the overvoltage protection device 100, and the output terminal OUT. The power to the load 140 can be received via the input terminal IN from the source 130.

The overvoltage protection device 100 is configured to shunt energy away from the load 140 in response to an undesirable power condition (which can include an overvoltage condition) such as a voltage spike (related to power supply noise or other transient power event). In this embodiment, the energy can be shunted to ground or to another voltage that is different from ground. In some embodiments, the overvoltage protection device 100 can be configured to protect the load 140 from voltage produced by, for example, a power supply (not shown) based on one or more voltage conditions (e.g., a voltage level sustained over a specified period of time, a voltage exceeding a threshold voltage).

In some embodiments, the source 130 can be a battery, a power supply, a power generator, one or more components included in a power adapter (or power converter) coupled to (e.g., plugged into), for example, a power outlet, and/or so forth. For example, in some embodiments, an energy (e.g., a voltage, a charging voltage) to the load 140 (and through the overvoltage protection device 100) can be from, for example, from a charging adapter. As another specific example, in some embodiments, the source 130 can be any type of power supply such as, for example, a switched mode power supply, a direct-current (DC) power supply, an alternating-current (AC) power supply, and/or so forth. As yet another specific example, in some embodiments, the source 130 can include a power source that can be any type of power source such as, for example, a direct current (DC) power source such as a battery, a fuel cell, and/or so forth.

In a traditional protection solution, the breakdown voltage (BV) of a TVS device is specified at current, where the current is pulsed or is relatively low, with the test methodology intended to avoid junction heating. As such, the traditional breakdown voltage rating is an ambient temperature breakdown voltage rating. Accordingly, in a traditional system design, a TVS device is selected such that the breakdown voltage rating is higher than the maximum operating voltage of the source. In this design methodology, due to component tolerances, there is typically a significant gap between maximum source voltage and maximum TVS breakdown voltage—thereby requiring the protected load be configured to operate at significantly higher voltages than may be desirable. More details related to this approach are shown in, for example, FIG. 2D.

In accordance with the embodiments described herein, the system is handled using a floating breakdown voltage TVS design where the traditional breakdown voltage rating may be below the max source operating voltage. For example, in accordance with embodiments described herein, the overvoltage protection device 100 can be configured so that the overvoltage protection device 100 protects the load 140 even with change (e.g., drift) in characteristics (such as a breakdown voltage) of the overvoltage protection device 100 that can occur during operation. Specifically, the overvoltage protection device 100 can be configured to account for drift of the overvoltage protection device 100 so that the load 140 can be protected by the overvoltage protection device 100 at a target operating point (or operating window) (e.g., a maximum target operating point) of the source 140. For example, a tolerance dead spot between a maximum source voltage of the source 130 and a point at which the overvoltage protection device 100 provides protection to the load 140 (e.g., shunts energy away from the load 140) can be substantially or completely eliminated. In some embodiments, the overvoltage protection device 100 can be configured (e.g., configured in accordance with an expected source 130 operating point, an expected load 140 operating point) with a known level of drift so that the load 140 can be protected by the overvoltage protection device 100 when the load 140 is at a target operating point and/or when the source 130 is at a target operating point (e.g., a maximum source voltage). When at the target operating point (of the source 130 and/or the load 140), the overvoltage protection device 100 can reach a steady-state (e.g., a thermal steady-state) that results in the overvoltage protection device 100 providing a desirable level of protection.

As an example, if the overvoltage protection device 100 is a transient voltage suppression (TVS) device (also can be referred to as a transient voltage suppressor) or avalanche breakdown device or zener diode, the TVS diode can be configured to shunt energy away (and clamp the voltage) from the load 140 at the breakdown voltage of the TVS diode. Specifically, the TVS diode can be configured so that the breakdown voltage of the TVS diode, when at a steady-state breakdown voltage (which can be referred to as a steady-state floating breakdown voltage), corresponds with (e.g., is approximately equal to, is slightly above) a maximum source voltage of the source 130. In some embodiments, the maximum source voltage of the source 130 may be a target maximum source voltage of the source 130. The maximum source voltage of the source 130 can be at, or within, a target operating point (or operating window) of the load 140. In some embodiments, the steady-state breakdown voltage can be referred to as a target breakdown voltage. In some embodiments, the maximum source voltage can be specified within a specification (e.g., a system specification) associated with the source 130 (and/or the load 140). In some embodiments, the maximum source voltage of the source 130 can be a voltage at which the load 140 can safely operate without being damaged in an undesirable fashion. In some embodiments, the maximum operating voltage (also can be referred to as a maximum load voltage) of the load 140 is greater than or equal to than the maximum source voltage of the source 130. Self-heating of the TVS diode, while the source 130 is operating at the maximum source voltage, can cause the breakdown voltage to stabilize at a voltage that is approximately equal to the maximum source voltage of the source 130. Specifically, the breakdown voltage of the TVS diode can be approximately equal to (or configured to be equal to) the maximum source voltage of the source 130 when the TVS diode has reached a thermal steady-state during operation of the computing device 170 and the source 130. Accordingly, the TVS diode can be configured with a breakdown voltage that corresponds with the maximum source voltage of the source 130 when the load 140 is at, or within, a target operating point (or operating window). When the source 130 is initially activated, the TVS diode can heat up, causing an increase (e.g., a dynamic increase) in the breakdown voltage of the TVS diode until the TVS diode reaches the thermal steady-state.

As a specific example in accordance with embodiments herein, the overvoltage protection device 100 can be rated with a breakdown voltage range of 34.5 V at a current of 1 milliamp (mA) and at an ambient temperature (e.g., a temperature of approximately 25° C.), and the source 130 may have a maximum source voltage of 35 V. The maximum source voltage of 35 V of the source 130 can be within, or at an upper boundary of, an acceptable operating window of the load 140. The overvoltage protection device 100 would appear to not be appropriately matched to the source as using traditional design techniques would demand that the breakdown voltage of the TVS be higher than the maximum steady state source operating voltage. However, during operation of the computing device 170 and the source 130 at the maximum source voltage of the source 130, a current of 0.05 mA may be drawn through (or provided to) the overvoltage protection device 100, resulting in self-heating and a steady-state temperature of 55° C. At the current of 0.05 mA and the temperature of 55° C., the breakdown voltage of the overvoltage protection device 100 can increase (with a positive temperature coefficient) to a steady-state breakdown voltage of 35.0 V, which is approximately equal to the maximum source voltage of the source 130. Accordingly, the overvoltage protection device 100 would immediately protect the load 140 from an input voltage exceeding the maximum source voltage of 35 V of the source 130.

As illustrated by this example, the breakdown voltage changes (e.g., floats) from a first breakdown voltage to a second breakdown voltage in response to a change in the source voltage. The first breakdown voltage can be referred to as a rated breakdown voltage or as an initial breakdown voltage, and the second breakdown voltage can be referred to as a floating breakdown voltage or as a target maximum breakdown voltage. The overvoltage protection device 100 relies on a positive temperature coefficient characteristic to employ the protection techniques described herein. In lower voltage systems (e.g., a system operating at voltage around 5 V), an overvoltage protection device may have a negative temperature coefficient that may preclude the design techniques described herein.

In contrast, using traditional design techniques, if the source has maximum source voltage of 35 V, a designer would find a TVS with a minimum breakdown voltage of 35V or greater. Given typical tolerances, this may require selection of a device with a typical breakdown voltage of 37V. Accordingly, the overvoltage protection device would not begin to clamp the output of voltage of the source and protect the load from an input voltage exceeding the maximum source voltage of 35 V of the source. The difference between the breakdown voltage of the overvoltage protection device at 37 V and the maximum source voltage of the source 35 V can be referred to as a dead zone.

In some embodiments, the current that is drawn through the overvoltage protection device 100 during operation of the computing device 170 at a source voltage of the source 130 (and/or at a target operating point (or operating window) of the load 140) can be referred to as a stabilizing current (or can be referred to as a balance current or as a steady-state current). In some embodiments, the current that is drawn through the overvoltage protection device 100 during operation of the computing device 170 at a maximum source voltage of the source 130 (and/or at a maximum operating point of the load 140) can be referred to as a maximum stabilizing current (or can be referred to as a maximum balance current or as a maximum steady-state current). Similarly, the temperature of the overvoltage protection device 100 at the stabilizing current of the overvoltage protection device 100 at the source voltage of the source 130 (and/or within the target operating window of the load 140) can be referred to as a stabilizing or steady-state temperature. In some embodiments, the temperature of the overvoltage protection device 100 at the stabilizing current of the overvoltage protection device 100 at the maximum source voltage of the source 130 (and/or at a maximum operating window of the load 140) can be referred to as a maximum stabilizing temperature or maximum steady-state temperature.

In some embodiments, the maximum source voltage of the source 130 can result in an overvoltage device operating point (or window) including a specified temperature of the overvoltage protection device 100, a specified stabilizing current through the overvoltage protection device 100, a steady-state or stabilizing temperature, and/or so forth. If related to temperature and voltage, the overvoltage (OV) device operating point (or window) at the maximum source voltage of the source 130 can be referred to as a maximum thermo-electric operating point (or window). If referenced with respect to the overvoltage protection device 100, the thermo-electric operating point can be referred to as a maximum overvoltage thermo-electric operating point. Specifically, the overvoltage protection device 100 can be configured so that the overvoltage protection device 100 will shunt energy from the source 130, in order to stabilize its BV, by using the energy to achieve temperature of the overvoltage protection device 100 and/or at a specified stabilizing current through the overvoltage protection device 100 that would be present during typical operation of the source 130. In other words, the overvoltage protection device 100 can be configured so that the overvoltage protection device 100 will shunt energy away from the source 130 to achieve a desired thermo-electric operating point.

Figure 2A:
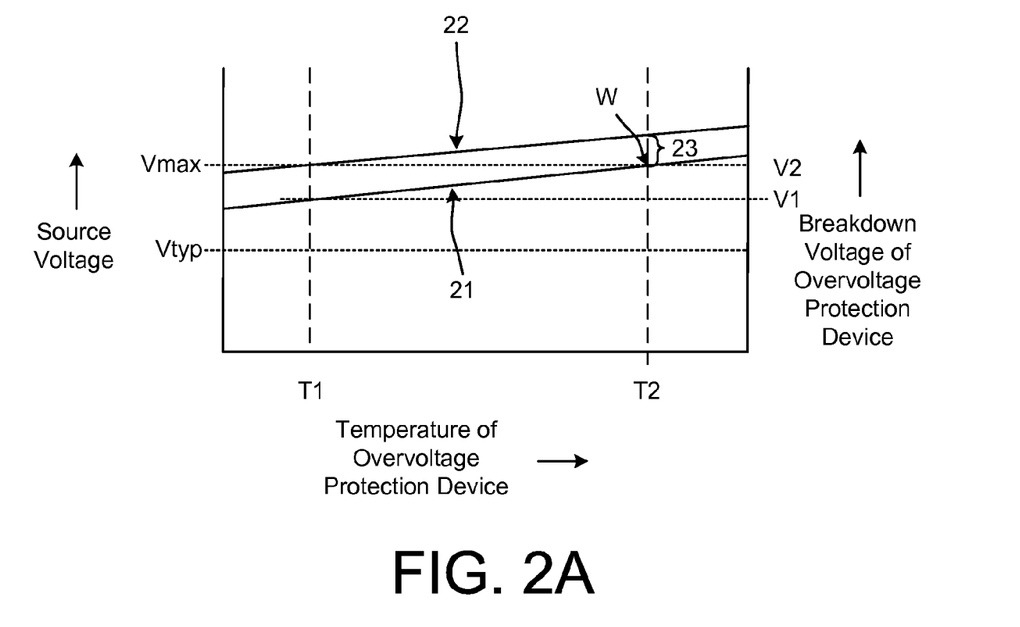
FIG. 2A illustrates an example of an overvoltage device operating point for the overvoltage protection device shown in FIG. 1.

FIG. 2A illustrates an example of an overvoltage device operating point W for the overvoltage protection device 100 shown in FIG. 1. In the graph shown in FIG. 2A, increasing source voltage (e.g., provided by source 130) is shown along a first y-axis and temperature of the overvoltage protection device 100 (which could be a junction temperature of the overvoltage protection device 100) is shown along the x-axis. Increasing breakdown voltage of the overvoltage protection device is shown along a second y-axis. As shown in FIG. 2A, the source 130 has a maximum source voltage Vmax, and a typical source voltage Vtyp. The overvoltage protection device 100 has a breakdown voltage 21 (e.g., a steady-state breakdown voltage) that increases with increasing temperature. In some embodiments, the temperature of the overvoltage protection device 100 can be a junction (e.g., a PN junction) temperature of the overvoltage protection device 100, can be an ambient temperature around the overvoltage protection device 100, or can be a temperature of a housing of the overvoltage protection device 100. In some embodiments, a target operating voltage of the load 140 can have an upper boundary greater than or equal to the maximum source voltage Vmax of the source 130 and/or a lower boundary equal to or less than the typical source voltage Vtyp of the source 130.

As shown in FIG. 2A, the overvoltage device operating point W is at temperature T2. Although not shown in FIG. 2A, the overvoltage device operating point W can correspond with a target operating point (not shown) (e.g., a target operating voltage, a target operating temperature, and/or so forth) of the load 140. In some embodiments, the target operating point W can be included in a target operating window (not shown) of the load 140.

As shown in FIG. 2A, the breakdown voltage 21 of the overvoltage protection device 100 is configured so that if an input voltage provided by the source 130 increases from the typical (or target) source voltage Vtyp, the overvoltage protection device 100 will shunt energy away from the source 130 at or before the input voltage reaches the maximum source voltage Vmax of the source 130. Specifically, in this embodiment, the breakdown voltage 21 of the overvoltage protection device 100 is configured so when the voltage provided by the source 130 is at the maximum source voltage Vmax the overvoltage protection device 100 will shunt current energy away at the breakdown voltage of V2. The overvoltage protection device 100 will shunt energy away from the source 130 because the breakdown voltage 21 of the overvoltage protection device 100 (which corresponds with the target operating point of the load 140) is at or below the maximum source voltage of the source 130. By shunting energy away from the source 130, the overvoltage protection device 100 will self heat and raise its floating breakdown voltage to achieve and maintain an operating point W. In some embodiments, the breakdown voltage 21 corresponding with the maximum source voltage of the source 130 (which is shown as approximately breakdown voltage V2) can be referred to as a target breakdown voltage. Although not shown in FIG. 2A, in some embodiments, the breakdown voltage 21 can be associated with a range of breakdown voltages or a breakdown voltage tolerance (e.g., a breakdown voltage tolerance of ±5%).

Figure 2B:
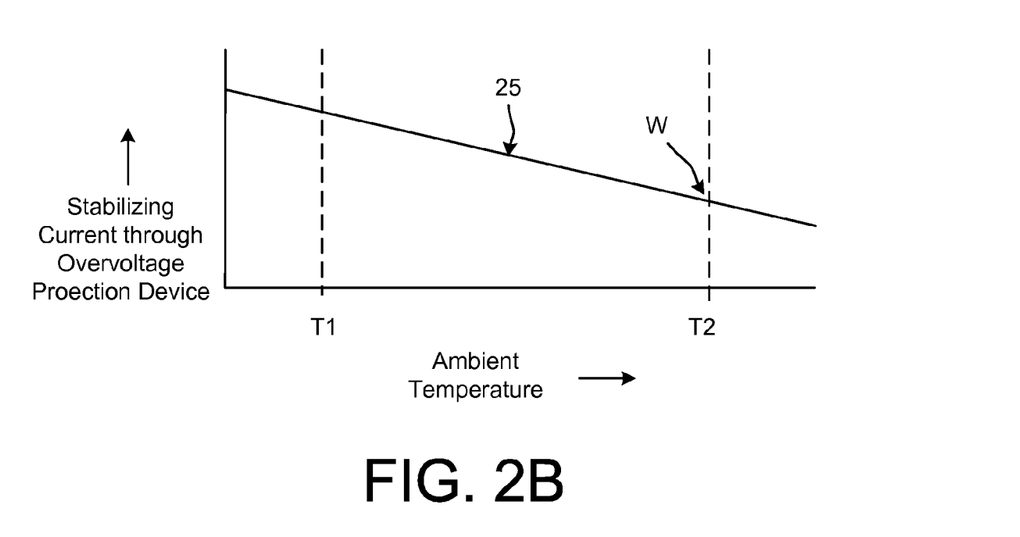
FIG. 2B is a diagram that illustrates a stabilizing current through the overvoltage protection device shown in FIG. 1.

During operation of a circuit including the overvoltage protection device 100 and the load 140, a stabilizing current through the overvoltage protection device 100 will maintain the temperature of the overvoltage protection device 100 at the overvoltage device operating point W. In other words, the stabilizing current through the overvoltage protection device 100 can define the overvoltage device operating point W. Said differently, the stabilizing current (or balance current) can heat a junction of the overvoltage protection device to an operating DC temperature. The magnitude of the stabilizing current needed to maintain a breakdown voltage of V2, will be a function of ambient temperature, and other design factors including the thermal conductivity of the device. FIG. 2B is a diagram that illustrates a stabilizing current 25 through the overvoltage protection device 100 shown in FIG. 1 that is needed to maintain a desired breakdown voltage V2 corresponding to a Vmax source voltage based on an ambient temperature. As shown in FIG. 2B, the stabilizing current 25 through the overvoltage protection device 100 decreases with increasing ambient temperature. In some embodiments, the stabilizing current 25 can be associated with a range of stabilizing currents or a stabilizing current tolerance (e.g., a stabilizing current tolerate of ±5%).

In some embodiments, the current range for a stabilizing current can change a few milliamps and with a change in temperature of more than 10° C. In some embodiments, the current range for a stabilizing current can change less or more than a few milliamps and with a change in temperature of more than 10° C. For example, in some embodiments, the current range for a stabilizing current can change approximately 10 milliamps and with a change in temperature of approximately 100° C. In some embodiments, the change in stabilizing current versus temperature can be different based on a source voltage. For example, the change in stabilizing current versus temperature can increase with increasing source voltage. Although the relationship shown in FIG. 2B is a linear relationship, in some embodiments, a change in stabilizing current with temperature can be a non-linear relationship.

In some embodiments, the stabilizing current can be a function of the input voltage (from a source), a breakdown voltage of the overvoltage protection device, a temperature coefficient of the breakdown voltage of the overvoltage protection device, a junction to air thermal resistance ($\theta_{JA}$), and/or so forth. In some embodiments, once an input voltage (e.g., maximum source voltage) is set and breakdown voltage of the overvoltage protection device is set, a junction temperature ($T_J$) of the overvoltage protection device can be configured so that the required stabilizing current is inversely proportional to ambient temperature or temperature of the overvoltage protection device and proportional to $\theta_{JA}$. In some embodiments, a stabilizing current can be reduced (or minimized) with a lower package and board thermal conductivity (e.g., a higher $\theta_{JA}$). More details related to $\theta_{JA}$ are discussed below.

Referring back to FIG. 2A, the temperature T1 is a temperature at which the overvoltage protection device 100 is rated for breakdown (e.g., rated for breakdown in a traditional room temperature specification). At the temperature T1, the breakdown voltage 21 is at a rated breakdown voltage V1. As shown in FIG. 2A, the breakdown voltage 21 at the rated breakdown voltage of V1 is significantly below the maximum source voltage Vmax of the load 140. Because the breakdown voltage 21 of the overvoltage protection device 100 increases as the temperature of the overvoltage protection device increases, the rated room temperature breakdown voltage V1 cannot be used as a guide. The breakdown voltage 21 at T1 is less than Vmax so the temperature of the overvoltage protection device is increased until the breakdown voltage at T2 is equal to (or approximately equal to) Vmax. In some embodiments, the rated breakdown voltage can be approximately 95% of the maximum source voltage Vmax. In some embodiments, the rated breakdown voltage can be greater than or less than 95% of the maximum source voltage Vmax.

FIG. 2A also illustrates a breakdown voltage 22 for a conventional overvoltage protection device (not shown) that has a rated breakdown voltage at the temperature T1 that is equal to the maximum source voltage Vmax of the source 130. In traditional device, due to device tolerances, breakdown voltage 22 is usually higher than source voltage (Vmax) at temperature T1. As shown in FIG. 2A, the breakdown voltage 22 of the conventional overvoltage protection device increases with increasing temperature. However, as shown in FIG. 2A, because the rated breakdown voltage of the conventional overvoltage protection device is equal to the maximum source voltage of the source 130 at the temperature T1, the breakdown voltage of conventional overvoltage protection device at the temperature T2 (which is at the operating point W) is significantly higher than the maximum source voltage Vmax of the source 130. Accordingly, the conventional overvoltage protection device would not provide protection to the load 140 until a voltage of the source 130 far exceeds the maximum source voltage Vmax. The difference between the voltage at which the conventional voltage protection device shunts current from the load 140 and the maximum source voltage Vmax of the source 130 can be referred to as a dead zone or dead spot. This dead zone requires the load 140 to be designed to withstand commensurately higher voltages.

As illustrated by FIG. 2A, the overvoltage protection device 100, which is tuned to operate with a stabilizing current associated with a target operating point of the load 140, improves clamping protection by eliminating a tolerance induced dead zone associated with the conventional overvoltage protection device. In some implementations, if the ambient temperature exceeds, for example, temperature T2, for an overvoltage protection device with breakdown voltage characteristic 21, the required stabilizing current will be approximately zero when the source is at Vmax.

Referring back to FIG. 1, a stabilizing current, which can correspond with a steady-state temperature and breakdown voltage, through the overvoltage protection device 100 can be a function of an input voltage provided by the source 130 into the overvoltage protection device 100 (and/or into the computing device 170). In some embodiments, the stabilizing current through the overvoltage protection device 100 can be a function of the breakdown voltage or leakage of the overvoltage protection device 100. In some embodiments, the stabilizing current through the overvoltage protection device 100 can be a function of the ability of the overvoltage protection device 100 to dissipate heat and/or a thermal coefficient of the overvoltage protection device 100. The ability of the overvoltage protection device 100 to dissipate heat can be represented by a junction to air thermal resistance ($\theta_{JA}$). A relatively high $\theta_{JA}$ can maintain the overvoltage protection device 100 at a steady-state temperature. The $\theta_{JA}$ of an overvoltage protection device is described in more detail below in connection with, for example, FIGS. 3A through 3D.

In some embodiments, power is used to heat the junction of the overvoltage protection device 100 to raise the breakdown voltage (Vz) to an input voltage level. As the ambient temperature increases (of a computing device), the amount of power (or stabilizing current) needed to keep the junction temp of the overvoltage protection device 100 elevated begins to drop, until some point where no internal heating of the junction is required.

Referring back to FIG. 1, the load 140 can include one or more electronic components (e.g., sensors, transistors, microprocessors, application-specific integrated circuits (ASICs), discrete components, circuit board) that could be damaged in an undesirable fashion by relatively fast increases in voltage. Accordingly, the input power protection device 100 can be configured to detect and prevent these relatively fast increases in voltage from damaging the load 140 and/or other components associated with the load 140 (such as a circuit board).

As shown in FIG. 1, the overvoltage protection device 100 and the load 140 can be included in (e.g., integrated into) a computing device 170. In some embodiments, the computing device 170 can be, for example, a computer, a personal digital assistant (PDA), a mobile phone, a host computer, an electronic measurement device, a data analysis device, a telecom device, a device configured for lightening protection, a cell phone, an electronic device, and/or so forth.

In some embodiments, the overvoltage protection device 100 can be configured to change conduction state from a voltage regulation state to a shorted state (e.g., a high conduction/low resistance state). When in the voltage regulation state, the overvoltage protection device 100 can be configured to limit (e.g., clamp) a voltage across the overvoltage protection device (and a downstream load) at a threshold voltage (e.g., a voltage limit, a clamping voltage). For example, if the overvoltage protection portion is, or includes, a TVS diode, the TVS diode can be configured to limit a voltage across the TVS diode at a TVS breakdown voltage when in the voltage regulation state. In some embodiments, the TVS diode can be a semiconductor device formed using a PN junction (which is formed with or associated with a p-type semiconductor and an n-type semiconductor) in any type of semiconductor materials such as, for example, silicon (e.g., a doped silicon), gallium arsenide, germanium, silicon carbide, and/or so forth.

In some embodiments, the overvoltage protection device 100 of the input power protection device 100 can be, or can include, for example, any type of transient voltage suppressor. In some embodiments, the overvoltage protection device 100 can be, or can include, for example, any type of device configured to change between a voltage regulation state (in response to voltage changes) and a shorted state (in response to temperature changes). In some embodiments, the overvoltage protection device 100 can be configured to reversibly or irreversibly change between the voltage regulation state and the shorted state. In some embodiments, the overvoltage protection device 100 of the input power protection device 100 can include one or more TVS diodes, one or more metal oxide varistors, and/or so forth.

Figure 2C:
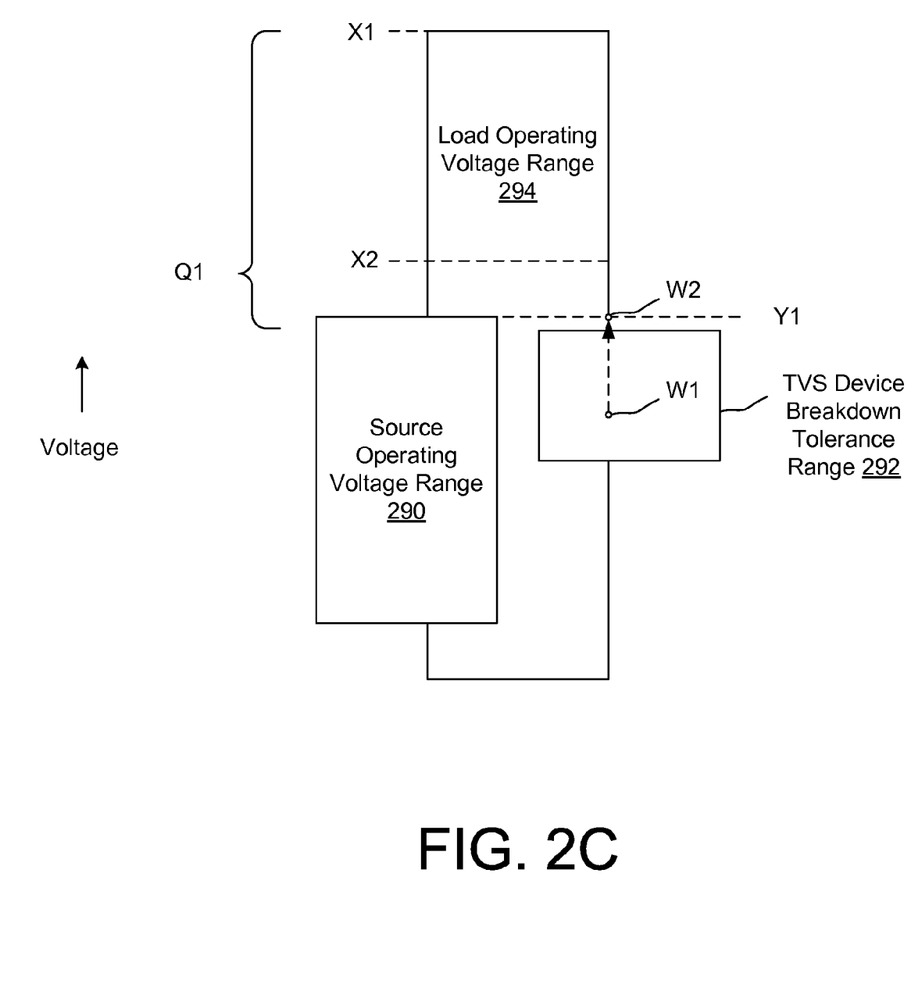
FIGS. 2C and 2D illustrate design scenarios according to embodiments.

FIG. 2C is a diagram that illustrates a source operating voltage range 290 associated with a source overlaid on a load operating voltage range 294 of a load included in a computing device. FIG. 2C also illustrates a TVS device breakdown tolerance range 292 of a TVS device overlaid on the load operating voltage range 294. The load operating voltage range 294 is greater (e.g., wider) than the source operating voltage range 290 and the TVS device breakdown tolerance range 292.

The TVS device can be designed so that a breakdown voltage of the TVS device increases from a breakdown voltage W1 (e.g., a first breakdown voltage, an initial breakdown voltage, a rated breakdown voltage) at an ambient temperature to a breakdown voltage W2 (at a stabilizing current) (e.g., a floating breakdown voltage, a maximum breakdown voltage) that corresponds with a maximum source voltage Y1 of the source. Accordingly, the TVS device will shunt energy (e.g., current) away from the load at approximately the breakdown voltage W2. Because the breakdown voltage of the TVS device at W2 is approximately equal to the maximum source operating voltage Y1, a maximum voltage X1 of the load operating voltage range 294 can be decreased within the design protection margin Q1 to, for example, a maximum voltage X2, which is much closer to the maximum source operating voltage Y1. The decrease in the maximum voltage X2 can result in cost savings when designing the load compared with design of a load that must operate with a higher maximum voltage such as maximum voltage X1. Although not shown in FIG. 2C, in some embodiments, the TVS device breakdown tolerance range 292 can exceed maximum source operating voltage Y1.

Figure 2D:
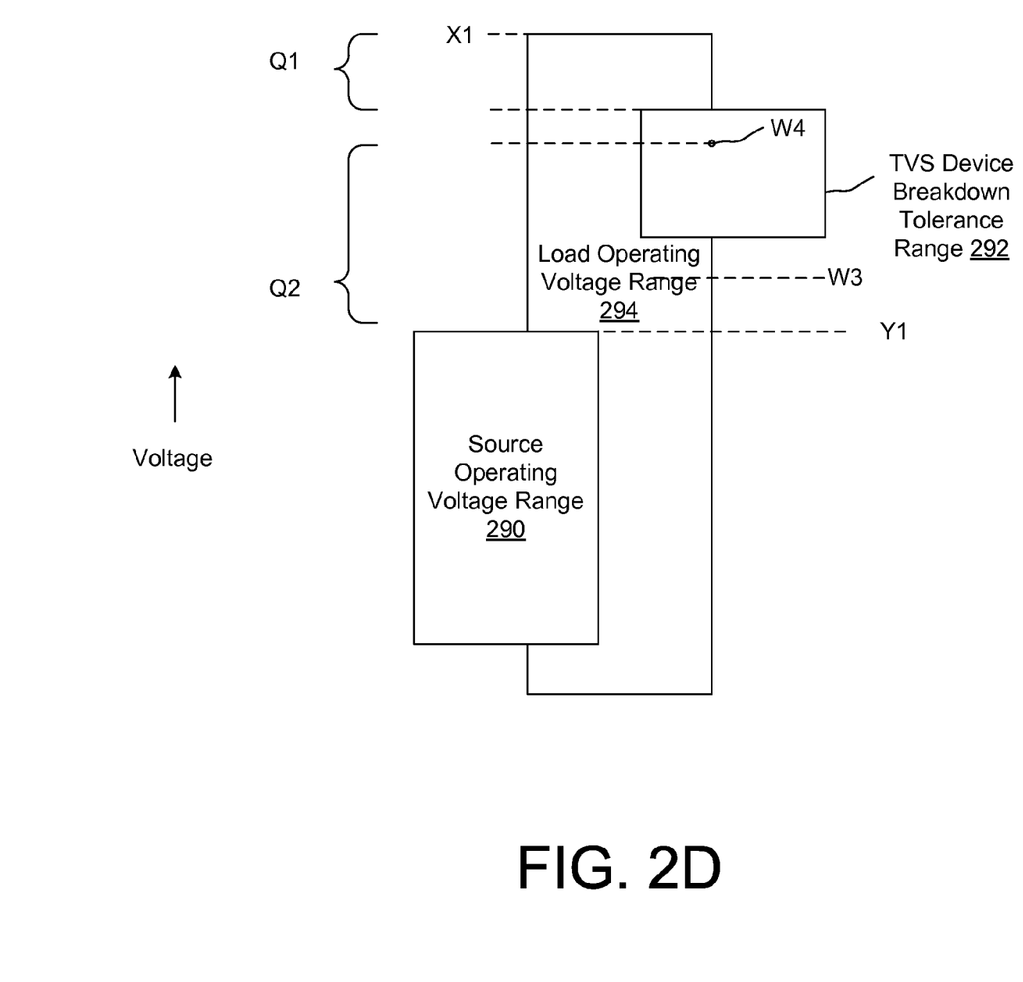

Without the design principles described herein, the operating ranges shown in connection with FIG. 2C may be modified to the configuration shown in FIG. 2D. As shown in FIG. 2D, the design protection margin Q1 is significantly decreased to a range between the maximum load voltage X1 and a maximum breakdown voltage of the TVS device tolerance range 292. Also, a tolerance induced dead zone of Q2 from the maximum source voltage Y1 to the actual breakdown voltage W4 of the TVS device is formed. In the diagram shown in FIG. 2D, the maximum working voltage $V_{RWM}$ W3 of the TVS device is designed to be above the maximum source voltage Y1. Accordingly, the maximum voltage that the load is designed to sustain must be maintained relatively high compared with that shown in FIG. 2C.

Figure 3A:
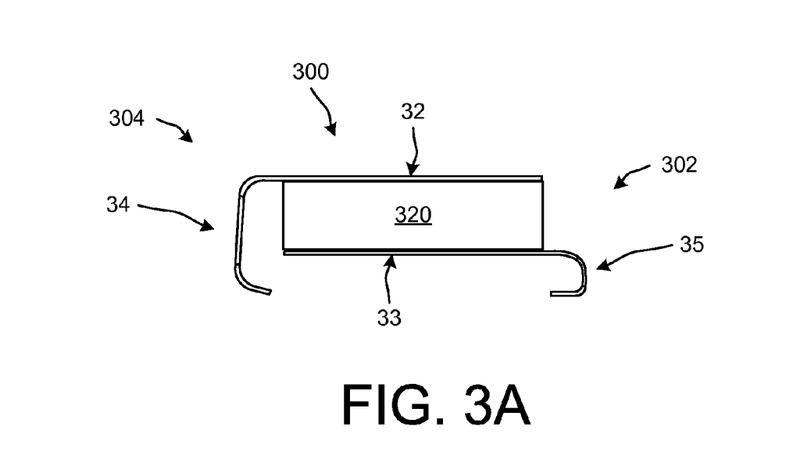
FIGS. 3A through 3D are diagrams that illustrate an overvoltage protection device, according to an embodiment.

FIGS. 3A through 3D are diagrams that illustrate an overvoltage protection device 300, according to an embodiment. The overvoltage protection device 300 includes a semiconductor portion 320 and conductive components 32, 33. The semiconductor portion 320 can be, for example, a transient voltage suppression device (e.g., a TVS diode) produced in a silicon substrate. As shown in FIG. 3A, the conducting component 32 is coupled to a top side of the semiconductor portion 320 and the conductive component 33 coupled to a bottom side of the semiconductor portion 320. The overvoltage protection device 300 is a distal portion 302 and a proximal portion 304.

Figure 3B:
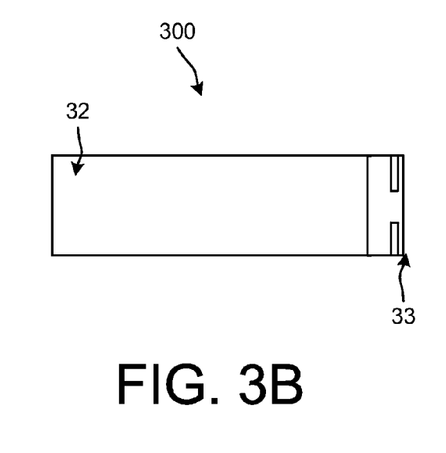

Either of the conductive components 32, 33 can function as an input conductive component or as an output conductive component. For example, if the conductive component 32 is functioning as an input conductive component, the conductive component 32 can be coupled to an input side of the semiconductor portion 320. Accordingly, the conductive component 33 can be functioning as an output conductive component and the conductive component 33 can be coupled to an output side of the semiconductor portion 320. Similarly, the conductive component 32 can function as an output conductive component, and the conductive component 33 can function as an input conductive component. FIG. 3B is a diagram that illustrates a top view of the overvoltage protection device 300.

Traditional TVS packages are often designed to maximize thermal conductivity away from the die 320 to the outside environment. That is not the case for packages designed as part of the embodiments described herein. As shown in FIG. 3A, the conductive components 32, 33 can each include a heat transfer barrier. The conductive component 32 includes heat transfer barrier 34, and the conductive component 33 includes heat transfer barrier 35. The heat transfer barriers are configured to prevent, or substantially minimize heat from dissipating from the semiconductor portion 320 to the outside world (e.g., a printed circuit board). In other words, the heat transfer barriers can help to maintain the temperature (e.g., a steady state temperature in response to a stabilizing current) of the semiconductor portion 320 during operation of the overvoltage protection device 300. As the heat retention capability of the overvoltage protection device 300 increases, the stabilizing current needed to maintain the overvoltage protection device 300 at a specified overvoltage device operating point (e.g., overvoltage device operating temperature) can decrease. The packaging of an overvoltage protection device can be designed with a relatively high thermal mass, but reduced thermal conductivity to achieve a solution that has high clamping capability, and a relatively low stabilizing balance current requirement. Accordingly, the overvoltage protection device 300, when protecting a load from a source, can maintain operation at a specific overvoltage device operating point (e.g., overvoltage device operating temperature) in a desirable fashion. The heat transfer barriers 34, 35 can be configured to prevent (or substantially prevent) heat transfer without inhibiting (or substantially without inhibiting) electrical conduction.

The ability of the overvoltage protection device 300 to dissipate heat can be represented by a junction to ambient thermal resistance ($\theta_{JA}$). A higher $\theta_{JA}$ can represent lower heat dissipation capability. A stabilizing current can be proportional to $\theta_{JA}$, so that a higher $\theta_{JA}$ results in a lower stabilizing current. In some embodiments, the conductive portion 33 has a portion coupled to the semiconductor portion 320 that includes a material with a thermal conductivity that is higher than, lower than, or equal to a thermal conductivity of a material included in the heat transfer barrier 35. In some embodiments, the conductive portion 32 has a portion coupled to the semiconductor portion 320 that includes a material with a thermal conductivity that is higher than, lower than, or equal to a thermal conductivity of a material included in the heat transfer barrier 34.

Figure 3C:
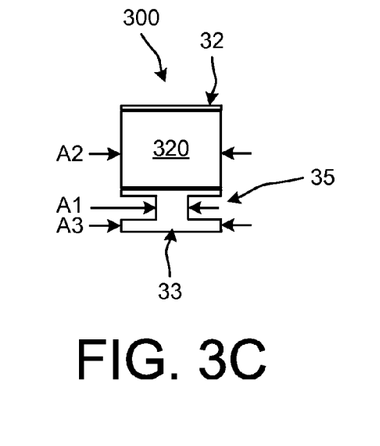

Specifically, as shown in FIG. 3C, which is a distal view of the overvoltage protection device 300, the conductive component 33 includes heat transfer barrier 35. The heat transfer barrier 35, in this embodiment, is defined by two notched portions (leaving a relatively small heat transfer surface area) of the conductive component 33 that substantially prevents heat from dissipating from the semiconductor portion 320 through the conductive component 33 to, for example, a printed circuit board (PCB) (not shown). In other words, the heat transfer barrier 35 can maintain, or substantially maintain, heat in the semiconductor portion 320. As shown in FIG. 3C, the heat transfer barrier 35 included in the conductive component 33 as a width A1 that is narrower than a width A2 of the semiconductor portion 320 and/or a width A3 (and/or an average width) of the conductive component 33.

Figure 3D:
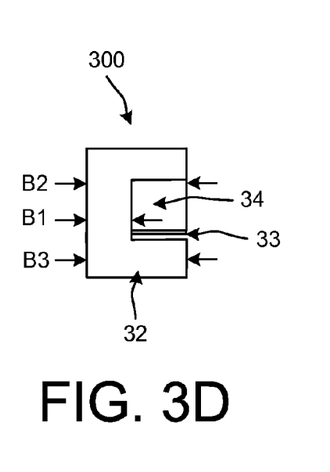

As shown in FIG. 3D, which is a proximal view of the overvoltage protection device 300, the conductive component 32 includes heat transfer barrier 34. The heat transfer barrier 34, in this embodiment, includes a single notched portion (leaving a relatively small heat transfer surface area) of the conductive component 32 that substantially prevents heat from dissipating from the semiconductor portion 320 through the conductive component 32 to, for example, a printed circuit board (PCB) (not shown). In other words, the heat transfer barrier 34 can maintain, or substantially maintain, heat in the semiconductor portion 320. As shown in FIG. 3D, the heat transfer barrier 34 included in the conductive component 32 as a width B1 that is narrower than a width B2 of the semiconductor portion 320 and/or a width B3 (and/or an average width) of the conductive component 32.

In this embodiment, the heat transfer barriers 34 and 35 are aligned along planes that are non-parallel to portions of the conductive component 32 and 33 that are coupled to the semiconductor portion 320. In some embodiments, the heat transfer barriers 34 and 35 are aligned along planes that are orthogonal to (or substantially orthogonal to) portions of the conductive component 32 and 33 that are coupled to the semiconductor portion 320.

Although shown as having notches (or recesses), in some embodiments, one or more of the conductive components 32, 33 can have heat transfer barriers with different shapes or profiles. For example, one or more of the conductive components 32, 33 can have curved portions, openings (which result in a decrease surface area), and/or so forth. In some embodiments, one or more of the conductive components 32, 33 can have multiple heat transfer barriers. In some embodiments, only one of the conductive components 32, 33 can have a heat transfer barrier.

Figure 4:
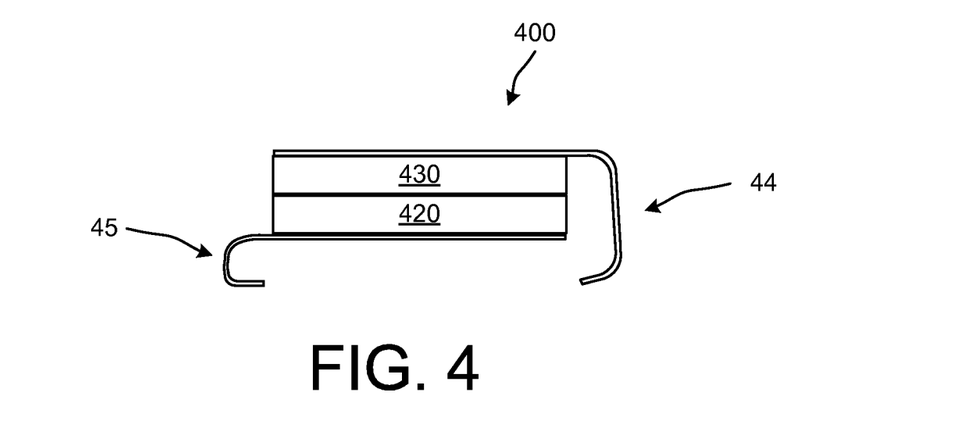
FIG. 4 is block diagram that illustrates another example of another overvoltage protection device, according to an embodiment.

FIG. 4 is block diagram that illustrates another example of another overvoltage protection device 400, according to an embodiment. As shown in FIG. 4, the overvoltage protection device 400 includes a semiconductor portion 420 (e.g., a TVS device) and a heat sink component 430. The overvoltage protection device 400 also includes heat transfer barriers 44, 45 that can be configured to prevent (or substantially prevent) heat transfer without inhibiting (or substantially without inhibiting) electrical conduction. Either of the heat transfer barriers 44, 45 (which can be conductive components) can function as an input conductive component or as an output conductive component.

The heat transfer barrier 45 can be coupled to (e.g., electrically coupled to) the semiconductor portion 420 and the heat transfer barrier 44 can be coupled to (e.g., electrically coupled to) the heat sink component 430. Specifically, the heat sink component 430 (with a relatively high thermal conductivity) is disposed between (e.g., electrically disposed between) the heat transfer barrier 44 (with a relatively low thermal conductivity) and the semiconductor portion 420, while the semiconductor component 420 is directly coupled to the heat transfer barrier 45. In some embodiments, the heat sink component 430 can have a higher thermal conductivity than a thermal conductivity of the heat transfer barrier 44 and/or the heat transfer barrier 45.

The heat sink component 430 is configured to draw heat away (based on the relatively high thermal conductivity) from the semiconductor portion 420 during, for example, a surge or transient energy event. However, the relatively low thermal conductivity of the heat transfer barriers 44, 45 can facilitate a relatively low stabilizing current needed to raise the temperature of the semiconductor portion 420 and consequently raise the breakdown voltage of the semiconductor portion 420 to a target level.

In some embodiments, the heat sink component 430 can be disposed over only a portion of the semiconductor portion 420. In other words, the surface area of the heat sink component 430 can be different than a surface area of the semiconductor portion 420.

Although not shown, in some implementations, one or more heat sink components can be included on a side of the semiconductor portion 420 opposite the heat sink component 430. In such embodiments, the semiconductor portion 420 can be disposed between the heat sink component 430 and an additional heat sink component. In such embodiments, the additional heat sink component can be directly coupled to the hear transfer barrier 45 (and disposed between the semiconductor portion 420 and the heat transfer barrier 45).

Figure 5:
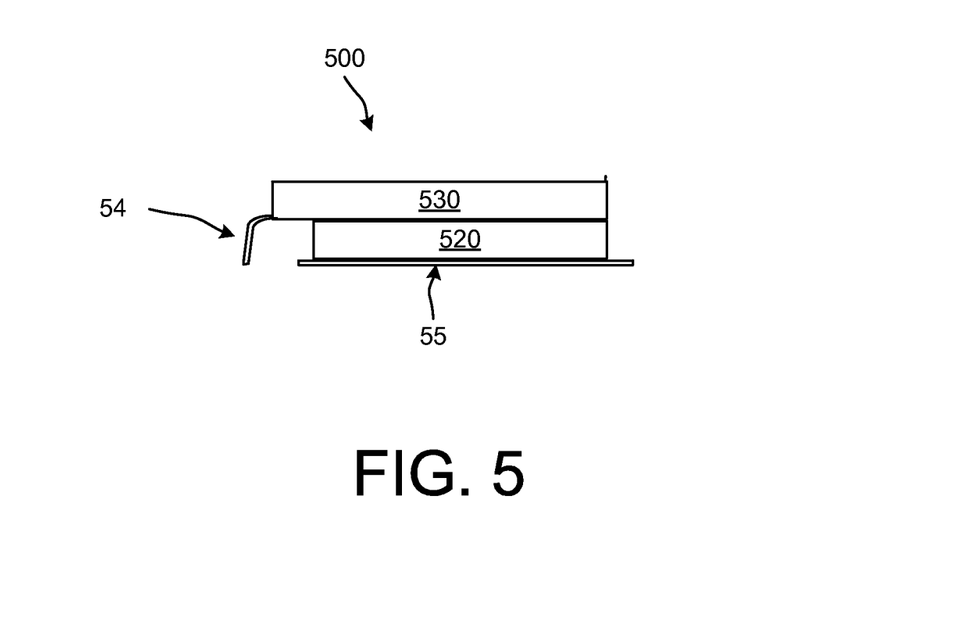
FIG. 5 is block diagram that illustrates yet another example of another overvoltage protection device, according to an embodiment.

FIG. 5 is block diagram that illustrates yet another example of another overvoltage protection device 500, according to an embodiment. As shown in FIG. 5, the overvoltage protection device 500 includes a semiconductor portion 520 (e.g., a TVS device) and a heat sink component 530. The overvoltage protection device 500 also includes heat transfer barriers 54, 55 that can be configured to prevent (or substantially prevent) heat transfer without inhibiting (or substantially without inhibiting) electrical conduction. Either of the heat transfer barriers 54, 55 (which can be conductive components) can function as an input conductive component or as an output conductive component.

The heat transfer barrier 55 can be coupled to (e.g., electrically coupled to) the semiconductor portion 520 and the heat transfer barrier 54 can be coupled to (e.g., electrically coupled to) the heat sink component 530. Specifically, the heat sink component 530 (with a relatively high thermal conductivity) is disposed between (e.g., electrically disposed between) the heat transfer barrier 54 (with a relatively low thermal conductivity) and the semiconductor portion 520, while the semiconductor component 520 is directly coupled to the heat transfer barrier 55. In some embodiments, the heat sink component 530 can have a higher thermal conductivity than a thermal conductivity of the heat transfer barrier 54 and/or the heat transfer barrier 55.

The heat sink component 530 is configured to draw heat away (based on the relatively high thermal conductivity) from the semiconductor portion 520 during, for example, a surge or transient energy event. However, the relatively low thermal conductivity of the heat transfer barriers 54, 55 can facilitate a relatively low stabilizing current needed to raise the temperature of the semiconductor portion 520 and consequently raise the breakdown voltage of the semiconductor portion 520 to a target level.

In some embodiments, the heat sink component 530 can be disposed over only a portion of the semiconductor portion 520. In other words, the surface area of the heat sink component 530 can be different than a surface area of the semiconductor portion 520.

Although not shown, in some implementations, one or more heat sink components can be included on a side of the semiconductor portion 520 opposite the heat sink component 530. In such embodiments, the semiconductor portion 520 can be disposed between the heat sink component 530 and an additional heat sink component. In such embodiments, the additional heat sink component can be directly coupled to the hear transfer barrier 55 (and disposed between the semiconductor portion 520 and the heat transfer barrier 55).

Figure 6:
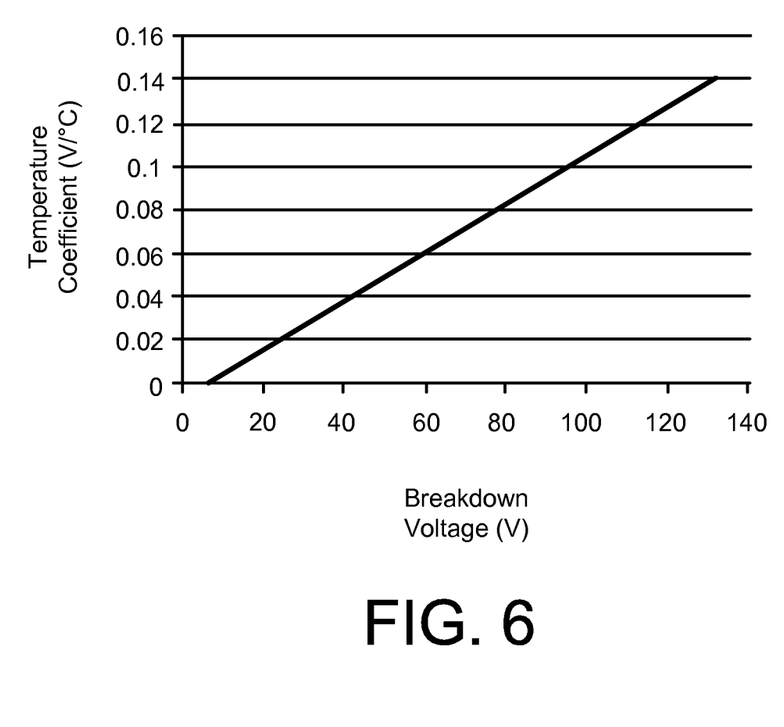
FIG. 6 is a diagram that illustrates an example temperature coefficient of an overvoltage protection device versus a breakdown voltage of the overvoltage protection device.

FIG. 6 is a diagram that illustrates an example temperature coefficient (TC) (in volts (V) per degrees Celsius (° C.)) of an overvoltage protection device versus a breakdown voltage (at a specified temperature) of the overvoltage protection device. As shown in FIG. 6, the temperature coefficient is a positive temperature coefficient that increases with increasing breakdown voltage. This relationship can be used to reduce the needed stabilizing current at an operating voltage of a particular device. Although not shown, in some embodiments, a temperature coefficient versus breakdown voltage relationship for an overvoltage protection device can be non-linear.

Figure 7A:
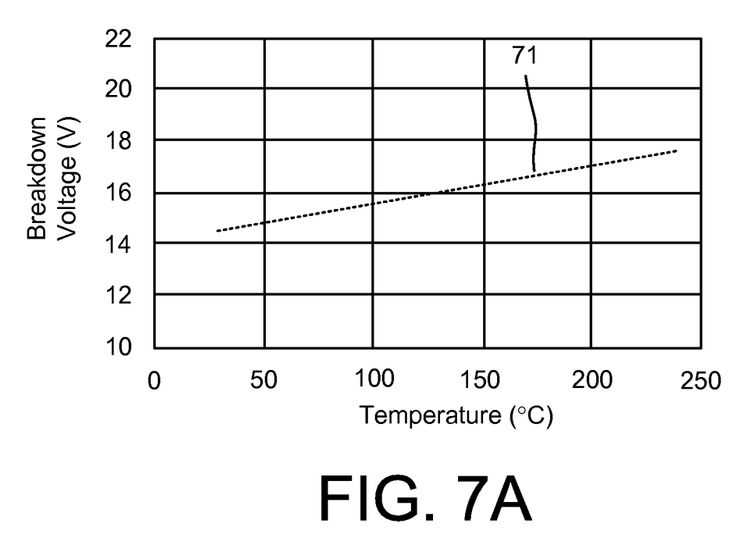
FIGS. 7A and 7B are associated with a specific example configuration of an overvoltage protection device and a load.
Figure 7B:
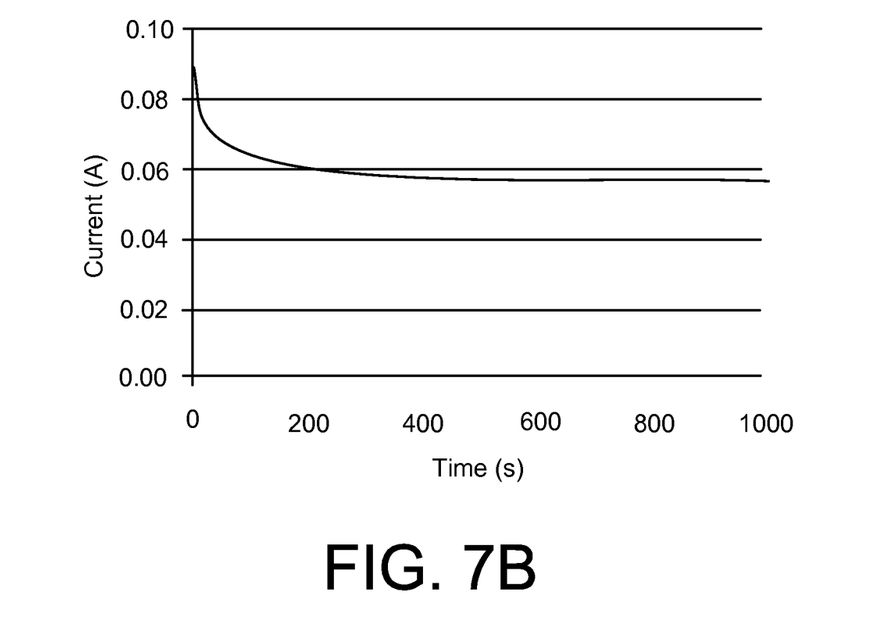

FIGS. 7A and 7B are associated with a specific example configuration of an overvoltage protection device (e.g., TVS diode) and a source that has a maximum operating voltage of 16 V. The configuration of the overvoltage protection device and the source can be the same as, or similar to, the configuration shown in FIG. 1. FIG. 7A is a graph that illustrates an increasing breakdown voltage 71 of the overvoltage protection device versus temperature. The overvoltage protection device has a rated breakdown voltage of 14.7 V at 1 mA. FIG. 7B is a graph that illustrates a 16 V hold test (or steady-state operating voltage) associated applying a 16V source to the overvoltage protection device. In this example, an initial clamp current is induced as the overvoltage protection device self-heats such that the breakdown voltage stabilizes (e.g., reaches a steady-state breakdown voltage). In this embodiment, the overvoltage protection device stabilizes at a temperature of approximately 125° C., which results in a breakdown voltage of approximately 16 V as shown in FIG. 7A. This breakdown voltage matches (or substantially matches) the maximum source voltage of 16 V of the source (if the maximum source voltage is used as a design point). As shown in FIG. 7B, an initial current through the overvoltage protection device can be relatively high (e.g., greater than 2 A) as the overvoltage protection device stabilizes at a stabilization current of approximately less than 60 mA with a $\theta_{JA}$ of 125° C./Watt. In this particular example, the stabilization (or steady-state) is reached at approximately 400 seconds. As illustrated by this example, self-heating of the overvoltage protection device is used to support a breakdown voltage for protection of the load at approximately a 16 V maximum source voltage. Although these examples are described in terms of a maximum source voltage, in some embodiments, the overvoltage protection device can be configured based on a voltage (e.g., a maximum load voltage, a typical load voltage) of a load).

Referring back to FIG. 1, the characteristics of the overvoltage protection device 100 can be selected using a variety of methods including that set forth below. First the typical source voltage and the maximum source voltage of the source 130 are identified. The overvoltage protection device 100 can be selected such that its maximum floating breakdown voltage is greater than or equal to the maximum source voltage of the source 130. The stabilizing current (which can be a maximum balance current) of the overvoltage protection device 100 at the typical source voltage of the source 130 can be identified, and the stabilizing current at the typical source voltage of the source 130 can also be identified. Finally, the downstream capability of the load 140 can be identified. It should be verified that the maximum operating voltage of the load 140 is greater than both the maximum rated breakdown voltage of the overvoltage protection device 130, and the expected maximum floating breakdown voltage of the overvoltage protection device 130. Once the maximum operating voltage of the load 140 is identified, the clamping capability of the overvoltage protection device 100 can be determined. The methodology described above can be characterized as a thermo-electric feedback loop that actively matches the breakdown voltage of the overvoltage protection device 100 to the input operational maximum source voltage of the source 130, to eliminate or minimize clamping dead space between the target maximum operating voltage and the activation (e.g., turn on) of the overvoltage protection device 100.

As a specific example, where the load 140 is a telecom backplane, the typical source voltage can be identified as 48V and the target maximum source voltage can be identified as 60V. The overvoltage protection device 100 can be selected as a device with a traditional breakdown specification of 54V to 60V at 1 mA and a 5% tolerance. The stabilizing current (which can be a maximum balance current) at the maximum source voltage can be identified as 14 mA, and the leakage current at the typical operating source of 48V can be identified as 1 µA. Finally, the downstream capability of the load 140 can be identified as 75V and the clamping performance can be identified as 5.5 A at 75V with a total protected power of 440 W. Although this examples are described in terms of a maximum source voltage, in some embodiments, the overvoltage protection device can be configured based on a voltage (e.g., a maximum load voltage, a typical load voltage) of a load).

The method identified above is contrasted with the conventional method of selection of an overvoltage protection device, which includes selecting a device with a reverse working voltage ($V_{RWM}$) that is greater than the maximum source voltage of the source. The associated breakdown rating and breakdown voltage versus maximum ambient operating temperature may be reviewed. If using this conventional methodology, clamping may not begin until well above the maximum operating source voltage (a clamping dead spot exists) which may result in a significant dead zone between the maximum source voltage of the source and an overvoltage protection device that will not provide adequate downstream protection to the load.

If applying the conventional selection methodology described above in the telecom backplane application, a device with a breakdown voltage of 67 V to 74 V at 1 mA with a 5% tolerance may be selected. The breakdown voltage of such a device at an operating temperature of 65° C. could be as high as, for example, 77V. In such instances the breakdown voltage would be 2V higher than the 75V maximum identified for the load.

Figure 8:
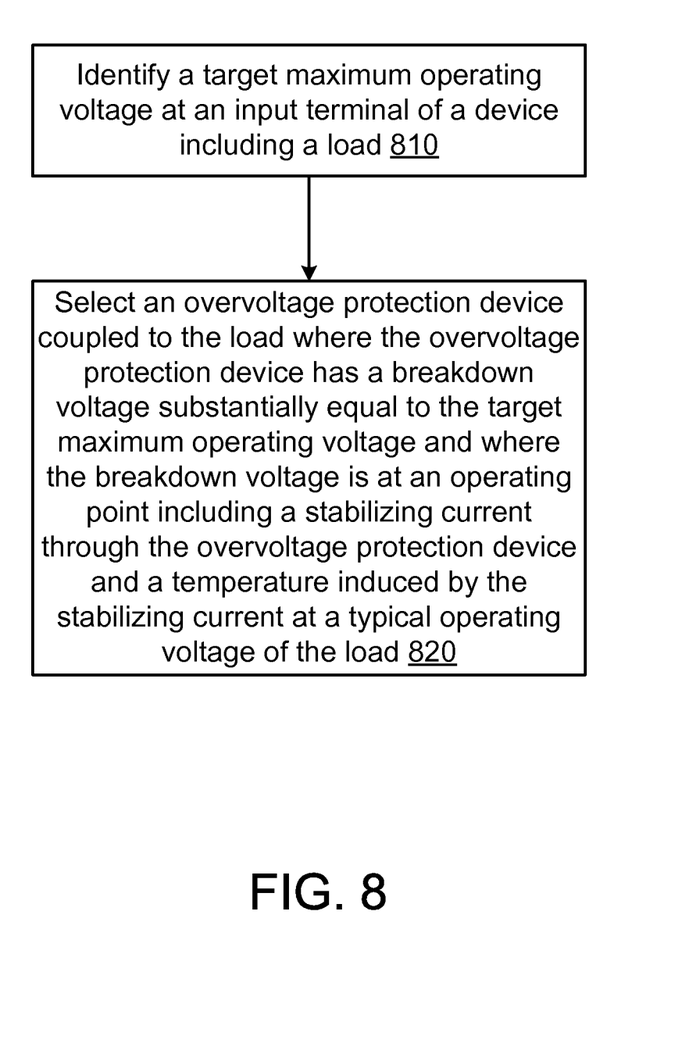
FIG. 8 is a flowchart that illustrates a method for selecting a transient voltage suppression device.

FIG. 8 is a flowchart that illustrates a method for selecting a transient voltage suppression device. The method can be associated with selecting the transient voltage suppression device 100 for the load 140 shown in FIG. 1.

As shown in FIG. 8, a target maximum operating voltage (e.g., target a maximum source voltage) can be identified at an input terminal of a device including a load (block 810). The device can be, for example, a telecom backplane device, a mobile phone, and/or so forth.

An overvoltage protection device coupled to the load can be selected where the overvoltage protection device has a breakdown voltage substantially equal to the target maximum operating voltage (e.g., target a maximum source voltage, a target maximum load voltage) and where the breakdown voltage is at an operating point including a stabilizing current and a temperature induced by the stabilizing current at a typical operating voltage of the load (block 820).

In some embodiments, the overvoltage protection device 100 can be integrated into a single integrated component (e.g., single discrete component). In some embodiments, the overvoltage protection device 100 can be integrated into a single package with three terminals—an input terminal IN, an output terminal OUT, and a ground terminal.

Implementations of the various techniques described herein may be implemented in digital electronic circuitry, or in computer hardware, firmware, software, or in combinations of them. Portions of methods also may be performed by, and an apparatus may be implemented as, special purpose logic circuitry, e.g., an FPGA (field programmable gate array) or an ASIC (application-specific integrated circuit).

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Some implementations may be implemented using various semiconductor processing and/or packaging techniques. Some embodiments may be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
   an input terminal;
   an overvoltage protection device coupled to the input terminal and configured to receive energy via the input terminal, the overvoltage protection device having a breakdown voltage at an ambient temperature less than a target maximum operating voltage of a source configured to be received at the input terminal, the overvoltage protection device having a floating breakdown voltage rating at a temperature higher than the ambient temperature, the floating breakdown voltage being greater than or equal to the target maximum operating voltage; and
   an output terminal coupled to the overvoltage protection device and a load.

2. The apparatus of claim 1, wherein the energy received via the input terminal, when at or below the target maximum operating voltage of the source, and above the ambient temperature breakdown voltage of the overvoltage protection device, causes an increase in a temperature of the overvoltage protection device, the increase in the temperature of the overvoltage protection device causes the breakdown voltage of the overvoltage protection device to increase to a voltage substantially equal to the target maximum operating voltage of the source.

3. The apparatus of claim 1, wherein the breakdown voltage is a rated breakdown voltage.

4. The apparatus of claim 1, wherein the breakdown voltage is a rated breakdown voltage at an initial current, the floating breakdown voltage is at a stabilizing current higher than the initial current.

5. The apparatus of claim 1, wherein the breakdown voltage at the ambient temperature is less than 95% of the target maximum operating voltage at the input terminal.

6. The apparatus of claim 1, wherein the breakdown voltage is a rated breakdown voltage at an initial current, the overvoltage protection device has a steady-state breakdown voltage higher than the rated breakdown voltage in response to energy being received via the input terminal during operation of the source and the load.

7. The apparatus of claim 1, wherein the target maximum operating voltage is a system voltage specified within a specification.

8. The apparatus of claim 1, wherein the energy is a charging voltage from a power supply.

9. The apparatus of claim 1, wherein the input terminal, the overvoltage protection device, and the output terminal are included in a mobile phone.

10. The apparatus of claim 1, wherein the input terminal, the overvoltage protection device, and the output terminal are included in a telecom device.

11. An apparatus, comprising:
   a semiconductor portion of a transient voltage suppression (TVS) device;
   an input conductive component having a portion coupled to an input side of the semiconductor portion of the TVS device and having a first heat transfer barrier; and
   an output conductive component coupled to an output side of the semiconductor portion of the TVS device and having a second heat transfer barrier.

12. The apparatus of claim 11, wherein the portion coupled to the input conductive component has a first width and the first heat transfer barrier has a second width different than the first width such that heat transfer from the transient voltage suppression device is decreased.

13. The apparatus of claim 11, wherein the portion coupled to the input conductive component is aligned along a first plane, the first heat transfer barrier is aligned along a second plane non-parallel to the first plane.

14. The apparatus of claim 11, wherein the heat transfer barrier is defined by at least one notch in the input conductive component.

15. The apparatus of claim 11, wherein the portion coupled to the input conductive component includes a material with a thermal conductivity that is higher than a thermal conductivity of a material included in the heat transfer barrier.

16. The apparatus of claim 11, wherein the first heat transfer barrier and the second heat transfer barrier are configured to change a rate of heat transfer from the TVS device during operation such that a quantity of stabilizing current to heat the TVS device to a target breakdown voltage of the TVS device is decreased.

17. A method, comprising:
    identifying a target maximum operating voltage provided by a source at an input terminal of a device; and
    selecting an overvoltage protection device coupled to a load, the overvoltage protection device having a target maximum breakdown voltage substantially equal to the target maximum operating voltage provided by the source coupled to the overvoltage protection device, the target maximum breakdown voltage being at an operating point including a stabilizing current through the overvoltage protection device and a temperature induced by the stabilizing current at the target maximum operating voltage provided by the source.

18. The method of claim 17, wherein the target maximum operating voltage provided by the source is greater than a typical operating voltage of the load, the target maximum breakdown voltage is a steady-state breakdown voltage induced by self-heating through the overvoltage protection device at the stabilizing current.

19. The method of claim 17, wherein the overvoltage protection device has an initial breakdown voltage at an ambient temperature that is less than the target maximum operating voltage and less than the target maximum breakdown voltage.

20. The method of claim 17, wherein the overvoltage protection device includes at least one heat transfer barrier.

* * * * *